May 24, 1955

A. F. SPERRY

2,709,249

INSTRUMENT UNITS FOR PROCESS ALARM SYSTEMS

Filed Oct. 2, 1952

INVENTOR.
ALBERT F. SPERRY
BY
Kegan & Kipnis
Attys.

May 24, 1955 A. F. SPERRY 2,709,249
INSTRUMENT UNITS FOR PROCESS ALARM SYSTEMS
Filed Oct. 2, 1952 9 Sheets-Sheet 3

INVENTOR.
ALBERT F. SPERRY
BY Regan & Ripnis
attys

May 24, 1955

A. F. SPERRY

2,709,249

INSTRUMENT UNITS FOR PROCESS ALARM SYSTEMS

Filed Oct. 2, 1952

INVENTOR.
ALBERT F. SPERRY
BY
Regan & Kipnis
attys.

United States Patent Office 2,709,249
Patented May 24, 1955

2,709,249

INSTRUMENT UNITS FOR PROCESS ALARM SYSTEMS

Albert F. Sperry, Chicago, Ill., assignor, by mesne assignments, to Panellit, Inc., Skokie, Ill., a corporation of Illinois Application October 2, 1952, Serial No. 312,821

22 Claims. (Cl. 340—213)

This invention relates to instrument units for electric process alarm systems. These new units are uniform, standardized and interchangeable for a great majority of the usual types of process alarm announcement.

In systems of this kind occasional danger signals are electrically transmitted from various hazardous field installations into an operating room more or less remote from the field. In this room corrective measures should then be arranged for. The danger or alerting signals received in the operating room must be very distinct since it may be necessary to attract attention very strongly and it always is necessary to distinguish signals of different origin or meaning.

The required signals may be very numerous since the number of potential field hazards may be great. Dealing with the existing trouble is then somewhat complex. In most cases it is basically necessary first to announce the fact that trouble exists somewhere and also to indicate the exact location; then to distinguish the last alarm which has not been acknowledged as yet from earlier alarms which should be in an acknowledged condition; and finally to indicate the end of the trouble condition.

Of these basic functions the second, involving alarm acknowledgment by the operating room attendant, is specially important for process systems. Simpler alarm systems, used in the fire protection of cities or buildings, in railroads and power plants and the like, do not have this second function; at least not in a form adequate for process industries.

A need for the distinction between unacknowledged and acknowledged alarm has been recognized to some extent, in the process industry, by the provision of an audible announcement or alert, together with a visual announcement in the operating room. Silencing of the audible alarm was usually followed by some modification of the visual announcement.

Difficulty was experienced when attempts were made to carry out the required alerting and other announcing functions with the required safety and also with the desirable economy, in a variety of process plants. This was connected with the fact that the required variations of the alarm system are manifold and that it is still necessary in each individual system to provide instrumentation with practically absolute safety, since the alarm system is that part of a plant which cannot be allowed to fail under any circumstances. Such a high degree of safety was hard to provide so long as each process alarm system practically had to be developed by itself, with all the trials and errors inherent in a new development.

Even if the development of a sufficiently flexible electric system of circuitry were the only object this would be a problem of some size. However an alarm system also requires at least a certain degree of economy.

All these considerations call for the mass production of interchangeable instrument units, applicable to all alarm purposes reasonably to be expected in the process industries. Ideally such interchangeable units should be almost as simple in use as the well known electric household fuse.

However the interchangeable unit should also provide considerably more versatile modes of operation and use, in order to minimize the required number of units and elements for the different systems. This again is important for the overall clarity and safety of an alarm system.

Further complications arise in the operating rooms of process plants producing hazardous atmospheres. The operating rooms are usually close to the field installation. They are therefore likely to be filled or partly filled with air carrying some of the gases, dust or other emanations from the field. Such rooms are known as semi-hazardous. This has been recognized for instance in safety standards established by code authorities such as the National Electric Code wherein such operating rooms are called Class 1 Division 2 locations. In such locations electric equipment is only conditionally allowed. Otherwise electric signaling of course is very desirable because of its versatility, rapidity and economy. Electricity is allowed when the devices are suitably protected for use in such locations. For instance wiring must be protected by metallic enclosures. Spark-producing switches, incandescent lamps and the like must be hermetically sealed in proper envelopes or containers. For instance it is quite usual to work with electric bulbs, mercury switches and other elements in glass envelopes. More recently a mechanical relay has also been enclosed in a hermetically sealed container, in certain industrial applications, and plug-in connections have been provided for such bulbs, containers and the like.

However the instruments so developed for alarm systems usable in semi-hazardous locations were large, cumbersome, inflexible, expensive and sometimes unsafe so long as they utilized relays and other elements in forms and combinations known and originally developed for other and less exacting purposes. The new units described herein are greatly improved in these respects.

In this new system the same cabinet or panel wiring can be utilized in each of the different basic announcing systems required, and in a great many modifications and combinations of the entire alarm system, at no added cost for such wiring and other instrument elements. This is achieved by novel arrangements of wiring and equipment arrangements in the plug-in containers and larger cabinets or panels, as will be described hereinafter.

In this description a single preferred embodiment of the basic unit is disclosed. While the description is specific, modifications thereof will be possible for a person skilled in the art, without departure from the scope of this invention. This scope is defined in the claims appended hereto.

*Figures 1 to 8*

Figure 1:
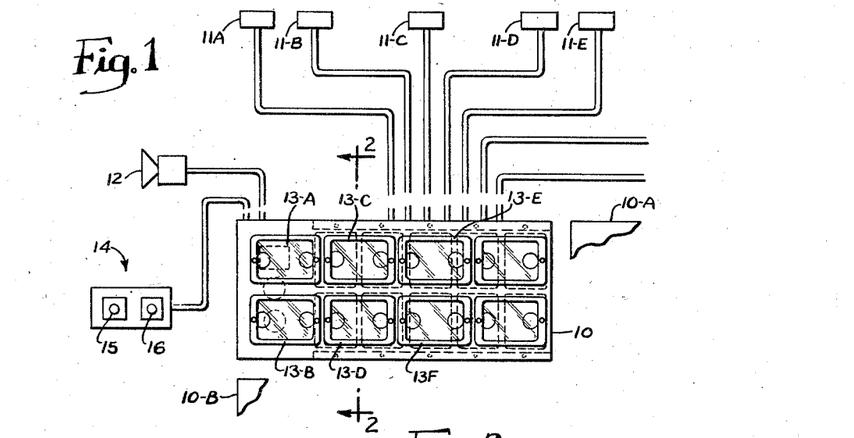
Figure 1 is a diagrammatic view of a system utilizing the present invention.

The alarm cabinet unit 10 is connected with a plurality of field switches 11-A, 11-B, etc., which are actuated by field apparatus such as liquid level floats, temperature responsive elements, governors or the like (not shown). The alarm system when excited by and from any one field switch, for instance from the field switch 11-A, must cause a strong annunciator unit such as horn 12 to sound, thereby alerting at least a large part of the plant personnel to the existing danger condition. It must simultaneously cause one of several alarm light units 13-A, 13-B, etc., in or on the cabinet 10, to indicate the exact source of trouble; in this case a light 13-A corresponding to the switch 11-A. For this purpose every field switch is connected with one alarm light unit. The back-lighted translucent name plate of the light unit is suitably imprinted to identify the float or other process element actuating the switch in question.

The cabinet 10 as shown contains eight name plates; this of course is merely an example. Several cabinets 10, 10-A, 10-B, etc., are usually provided to provide a sufficient number of name plates for a medium sized or large installation; suitable grouping of the different units being maintained in conventional manner. It will be understood that the term cabinet unit may also designate a chassis or a panel element, mounted in any of the various manners well known to the art.

At some suitable location, often adjacent the cabinet 10, 10-A, etc., a push button station 14 is provided which if necessary may be constructed in explosion-proof or other hazard-resistant form. One of the push buttons of this station, shown at 15, serves to acknowledge the alarm or alert sounded by the horn and indicated by one of the lights. As this push button is depressed momentarily the horn is silenced, in order to avoid continued disturbance of operating personnel at locations outside of the operating room or endangered field unit. A visual alarm is still required in the operating room to identify the acknowledged but unremedied trouble; however in order to distinguish between the unacknowledged and acknowledged alarm conditions the visual alarm is now modified. The specific modification of Figures 1, etc., provides the use of a "flashing" light at 13-A, in the "alert" position, by means of a flasher relay 17-F, as will be described. This is modified into a "steady" light at 13-A, in the "acknowledged" alarm position.

The other alarm lights 13-B, etc., remain dark when the switch 11-A operates. However subsequent or simultaneous trouble at 11-B, 11-C, etc., may cause an alert at 13-B, 13C, etc., again accompanied by the sounding of the horn. Thus it is possible that several alarm lamps are in lighted condition simultaneously but ordinarily only one of them should be flashing while one or more of the others may be lighted steady.

When the liquid finally recedes from the dangerous level the switch 11-A is reversed and the light 13-A extinguished. This indicates that field conditions have returned to normalcy.

In order to allow testing of the alarm lamps at 13 and thus to prevent failure of the alarm system due to the gradual burning out of these lamps there is provided as a second part of the push button station 14 a lamp test button 16. Depression of this button causes alarm lamps 13 to light up, with the exception of those which have burned out. Those lamps can then be replaced.

The successive interconnections of each individual signal switch 11 with a common horn 12, with an individual, modifiable lamp unit 13 and with a common push button 14, are effected by means of a single relay plug-in unit 17. This unit is installed in the cabinet 10 adjacent the lamp 13. All plug-in units 17-A, 17-B, etc., are of identical construction at least mechanically, so that all of them will fit the sockets provided in the cabinet. In most instances it is also possible to keep all plug-in units uniform as to their internal electric wiring and arrangements so that they are freely interchangeable among one another. This facilitates removal and reinsertion of these units, for instance for the occasional checking of cabinet wiring, plug-in wiring, etc. Furthermore this feature allows mass fabrication of the plug-in units. These units are required in dozens, hundreds or thousands, depending on the size of the process plant involved and the complexity of the process.

Figure 2:
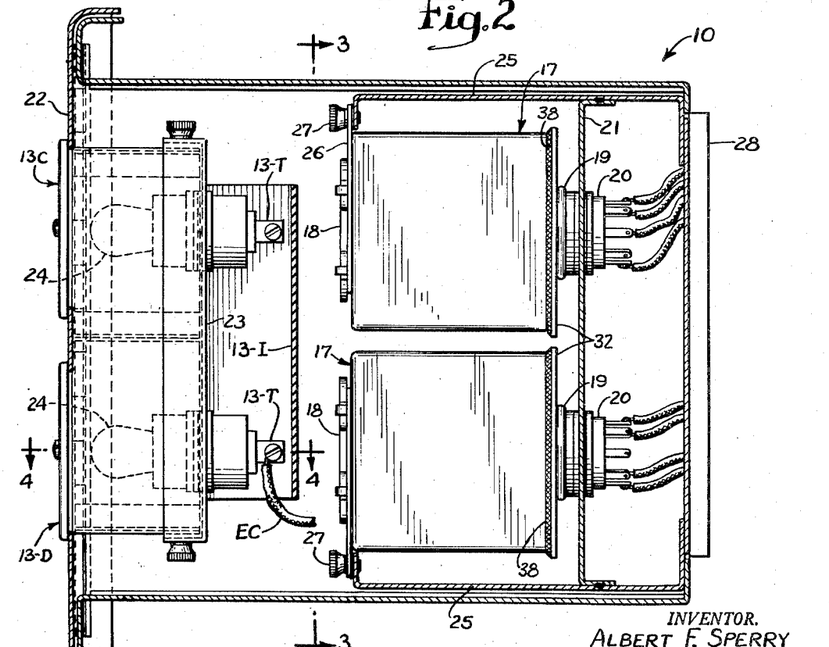
Figure 2 is a section through an alarm cabinet embodying this invention showing also a front door unit connected with the cabinet the section being taken along lines 2—2 in Figure 1.
Figure 5:
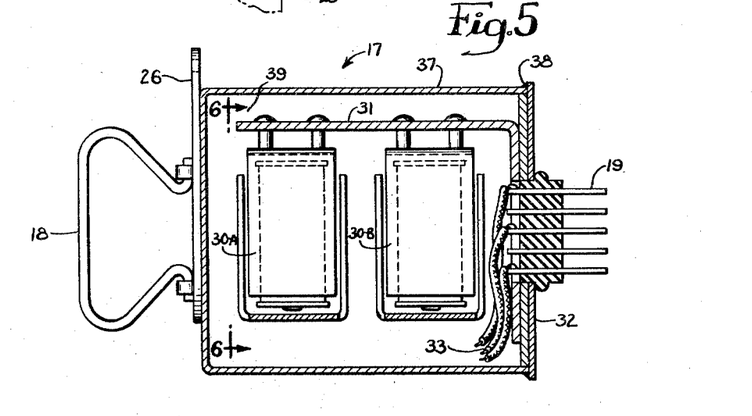
Figure 5 is an enlarged section through one of the plug-in units in the cabinet the section being taken along lines 5—5 in Figure 3.

For the manipulation of each plug-in unit 17, that is for the removal thereof from a shipping container, insertion in the cabinet 10, and removal from said cabinet, the metal enclosure of the unit has a handle 18 at one end. It further has a multiple-prong plug unit 19 at the other end. This plug unit is secured and sealed to the back wall of the container 17 and normally inserted in a matching multiple-recessed socket 20, installed in the cabinet 10. Eleven recesses and eleven prongs are shown for each unit.

The sockets 20 are suitably mounted on a chassis 21 installed in the cabinet 10, preferably in a vertical plane, since the cabinet is usually mounted on a panel; however it is possible to install the plug-in unit 17 in any desired position, for instance vertically or horizontally or with any desired angular orientation. This is possible by the use of mechanical relays in the plug-ins 17, instead of mercury switches or the like.

Figure 4:
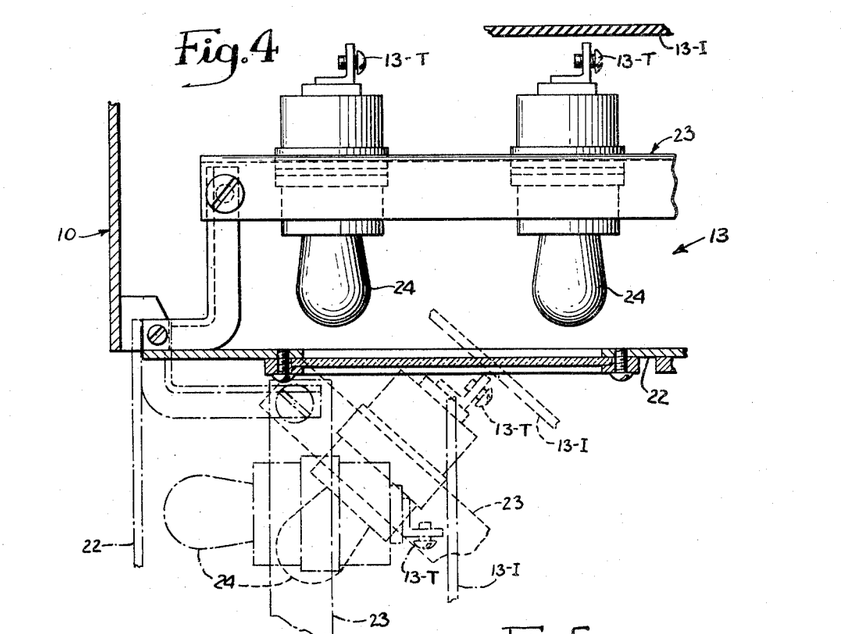
Figure 4 is a partial enlarged section through said front door unit along lines 4—4 in Figure 2.

The preferred cabinet unit 10 has a hinged and removable front door 22 to provide access to the plug-in units. A separately hinged bezel 23 on the inside of the front door 22 supports the bulbs 24 of the alarm lights 13 and provides access to these bulbs. The lamps terminals 13-T, which are normally opposite the plug-ins 17, are protected by an insulating back cover 13-I of the bezel.

By means of the separate or separable door and bezel, checking and interchanging of light bulbs as well as plug-ins is facilitated.

The cabinet 10 and mainly the chassis 21 therein, with all parts mounted directly on said chassis, can be exactly the same for all systems considered herein. On the other hand different bezels 23 are used in different alarm systems utilizing the uniform cabinet and chassis. While it is possible to adopt different designs for this cabinet and chassis, in a great number of respects, it is also possible to utilize one such design, once adopted, for a great variety of purposes, thereby utilizing the advantages of mass fabrication for the enhancement of economy and safety of alarm systems.

In the cabinet 10 a shelf 25 supports each row of plug-ins 17. Upon insertion of any plug-in 17, a clip 26 on the front wall of the plug-in is aligned with a matching portion of the shelf 25. It can be connected therewith mechanically and electrically, for instance by a screw 27. It will then hold the plug-in securely in place without excessive mechanical load on the plug and socket units 19, 20. It will additionally ground the metal plug-in container in case of electrostatic loading.

Figure 14:
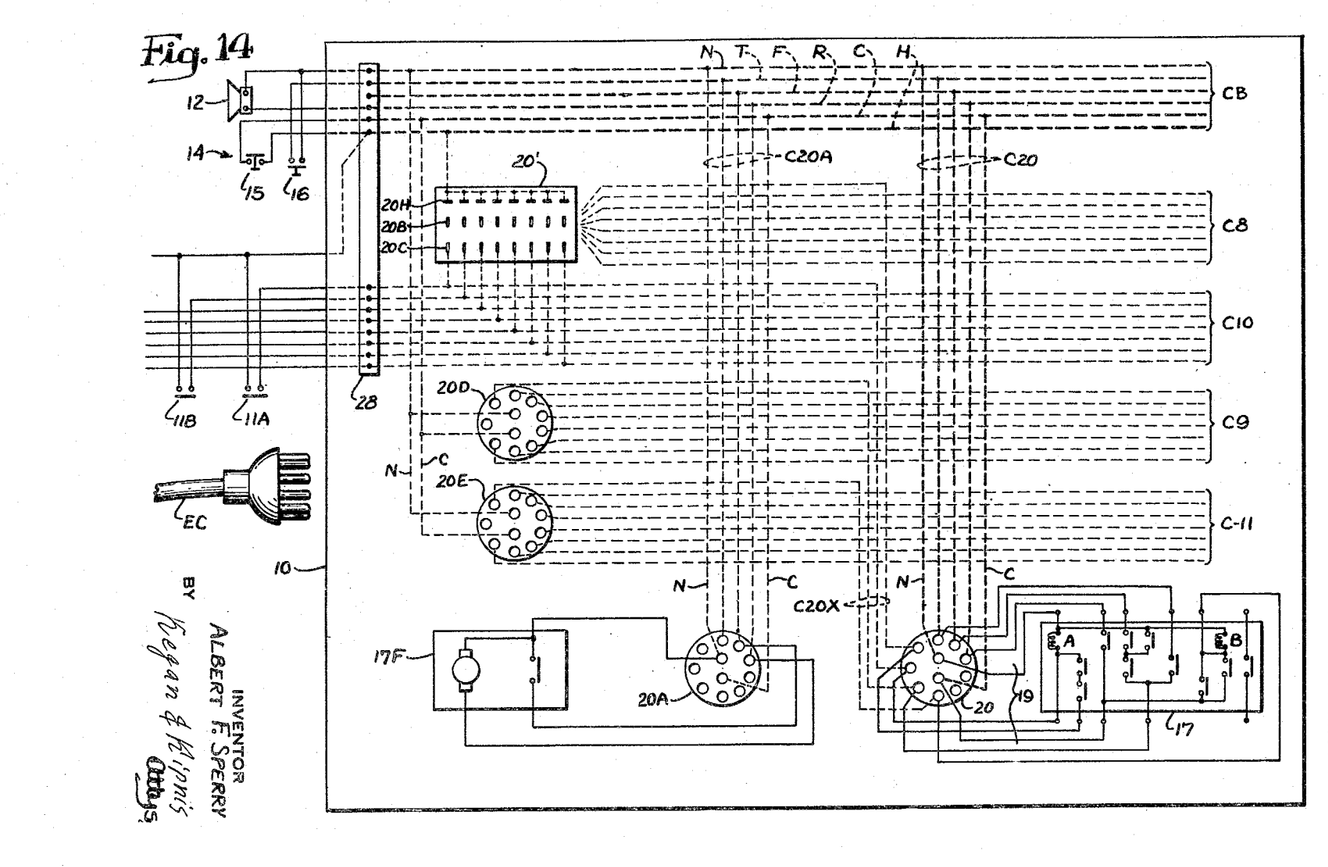
Figure 14 is a diagrammatic front view of the cable and wiring arrangements used in the cabinet according to the present invention.

In the back of the cabinet 10, behind the chassis 21 there is provision for one or several terminal blocks 28. The terminals on these blocks serve to connect the cabinet with the field switches 11, the horn 12 and the push button station 14 as best shown in Figure 14.

Figure 3:
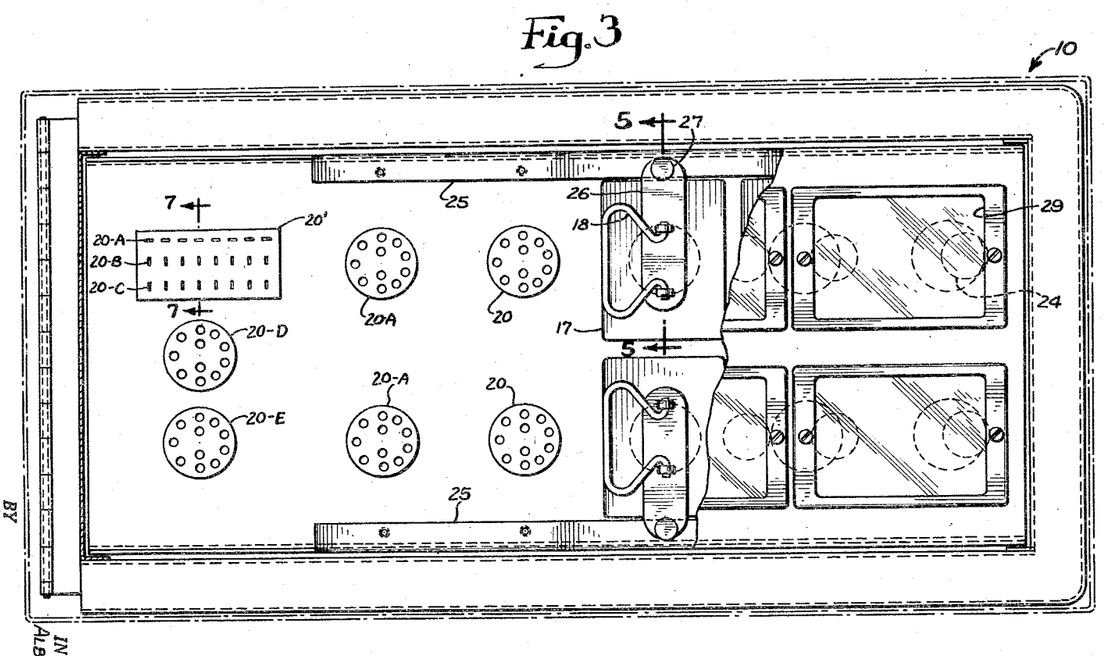
Figure 3 is a front view of said cabinet.

Inspection of Figure 3 will show that provision is made, in the case illustrated, for the installation of eight plug-ins 17, corresponding with the eight alarm lights 13 which are shown. Usually a group of a certain number of plug-in units 17, with adequate electrical and mechanical provisions for the purposes outlined herein, can be made somewhat smaller than the corresponding group of back-lighted name plates 29. Accordingly this group of plug-ins 17 and matching sockets 20 is shown as being shorter than is the cabinet 10 and front door 22; the remaining cabinet space being used for auxiliary parts of the electric system such as sockets 20–A for flasher relay plug-ins. In addition this space provides sockets or socket terminals 20–B, 20–C, 20–H, 20–D and 20–E, adjacent the point of attachment of the front door 22. These added sockets and parts thereof are provided in order to allow easy, safe and rapid change of front doors and lighting units thereon, depending upon the exact system of visual announcement desired, and without any change in the cabinet forming the main object of the present invention.

The socket terminals 20–B and 20–C, the function of which will be described hereinafter, are provided in a socket unit 20' which is shown as having twenty-four recesses. All other sockets 20, 20–A, 20–D and 20–E provide eleven recesses, for the insertion of eleven prong plugs. In this manner the number of types of repair parts or spare parts potentially required is minimized, again in the interest of full safety as well as economy.

Figure 6:
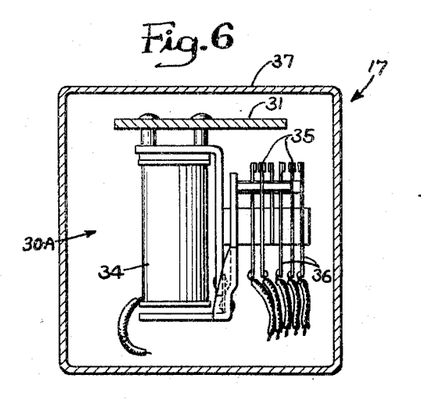
Figure 6 is a partial section through said plug-in unit along lines 6—6 in Figure 5.

Each plug-in unit 17, as best shown in Figures 5 and 6, contains two clapper type four-pole double throw relays 30–A and 30–B, mounted on a plate 31 which is rigid with the end wall 32 containing the eleven connector plug 19. In this manner the interior plug-in wiring 33, interconnecting the plug terminals with the relays, can be installed conveniently, prior to the installation of the cover 37 which carries the handle 18 and clip 26. This cover is ultimately sealed to the end wall 32 by a continuous solder strip 38. Each plug-in unit is desirably filled with an inert gas such as nitrogen, at atmospheric pressure, thereby preventing oxidation of terminals due to sparking in the space 39 defined by the wall 32 and cover 37. Similarly this nitrogen atmosphere removes the open pole relay switches from any semi-hazardous atmosphere filling the operating room, thereby providing at least the same degree of safety as possessed by incandescent alarm lamps or the like. Where such lamps are allowable at all, the present relay units and cabinets for the same are allowable.

Figure 9:
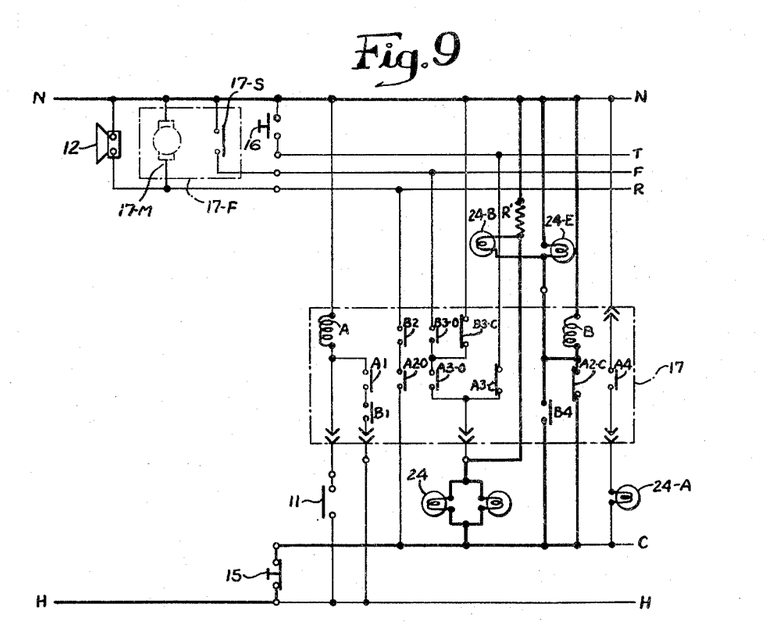
Figure 9 is a schematic diagram of typical circuits which may be used in a system utilizing the present invention.

*Figure 9*

In addition to the usual "hot" and "neutral" wires H and N four busses C, R, F and T are used. The C bus serves as a primary control wire for the purpose of distinguishing the "alert" from the "acknowledged alarm." The normally closed acknowledgement push button 15 is interposed between this bus and the basic hot wire H. The R bus is part of the potentially hot side of the system, leading to the horn 12. The N, T and F busses form the neutral side of the system. Plug-ins 17, one of which is shown, are interposed between the H and C busses on the one hand and the R, F, T and N busses on the other.

Each plug-in contains two relay coils A and B and has preferably four switches 1, 2, 3 and 4 controlled by each of these coils.

In the A relay it is possible to provide only three switches. The switch A–4 is provided largely as an extra feature, for more or less duplicated alarm functions or added control functions or the like. In some cases it is also possible to simplify the relays as to the switches A–1 and B–1. If these switches are omitted there remains an internal plug-in relay system with only two A switches A–2, A–3 and three B switches B–2, B–3 and B–4. These are the basic elements of the present apparatus. Both A switches A–2 and A–3 are of the double throw type, with contacts A–2–0, A–2–C and A–3–0, A–3–C respectively. Of the B switches only B–3 has double throw and double contacts B–3–0, B–3–C. For schematic representation in Figure 9, the two sides of each double throw switch are shown as separate switches since this allows simpler representation of the internal and external wiring.

It is generally desirable to make the plug-in 17 large enough for all of the eight switch poles (two relays with four poles each) although a number of alarm systems using these plug-ins require only a total of five, six or seven switch poles. Likewise it is desirable to provide the necessary plugs, sockets and intermediate wiring for all eight switch poles. It will appear from the following disclosure that both safety and economy are increased by this standardization.

The A relay is in one position while the field apparatus functions normally and in the opposite position while the field is abnormal. The first (functionally normal) position of A is, de-energized; the second (functionally abnormal) is energized. This is achieved by placing and keeping the normally open field switch in closed condition when and while the field apparatus functions abnormally.

The B relay is placed in energized condition by the termination of the alarm sequence, and remains energized while the field apparatus functions normally; also during an alert. It is de-energized by acknowledgement and remains de-energized during acknowledged alarm. For this purpose it is connected to the C bus. This is done, for reasons to be shown presently, through either of two circuits. One of these circuits contains a switch element A–2–C which closes upon de-energization of A (end of functionally abnormal condition and return to functional normalcy). The other circuit for coil B contains a normally open switch B–4 whereby the B relay seals in and remains energized from the C bus even after the reversal of A–2–C which takes place at the start of the alert. Thus the B relay can be de-energized only by manually opening the normally closed acknowledgement switch 15 and can be energized only by automatic operation of 11, A and A–2–C.

In this manner a simple cycle is obtained as follows:

| Field | Relay A | Relay B |
|---|---|---|
| Normal | Position 1 De-energized. | Position 2 Energized. |
| Alert | Position 2 Energized | Do. |
| Acknowledged Alarm | do | Position 1 De-energized. |

On this basis those announcements which are required only during the alert can be effected by causing suitable cooperation of A and B relay switches. For instance, sounding of horn 12 is effected by switches A–2–0 and B–2 which are interposed in series upon the horn circuit. Equipment units may be used during different phases of the sequence but may be required to provide one specific announcement only during the alert. Thus the flashing of a bright light 24 is effected by switch elements A–3–0 and B–3–C which are interposed upon the circuit of light 24. Of course separate switch combinations A–2–0, B–2 and A-3-0, B-3-C are used in order to allow use of the horn during a single, alerting phase while using the light differently (flashing or steady) during different phases as will be explained hereinafter. The switch element B-3-0 is interposed between A-3-0 and the N bus, in series with the switch 17-S of a flasher relay 17-F. This flasher relay is conventionally energized by a flasher motor 17-M, connectable and disconnectable together with horn 12.

An announcement required only during acknowledged alarm is best effected by or with the B relay. Thus the "steady" illumination of lamp 24, instead of flashing, is effected by reversal of the double throw switch B-3. A light desired to be "on" during normal and alert conditions, can best be connected in parallel with the coil B. Such a light is shown at 24-E. A light desired to announce only the alerted field condition by being "on" and bright during the same is shown at 24-B. It can be put "on" by being connected with the C bus through the parallel switches A-2-C, B-4 (both being open after end of alert) and with the "N" bus through the switches A-3-0, B-3-C (both being open before beginning of alert). Still another auxiliary light 24-A can sometimes be connected between busses C and N by a normally closed switch A-4 to provide a light that is "on" only during normal field condition and "off" during alert and alarm.

In order to test the alarm and auxiliary lamps 24, 24-B there is interposed between these lamps and the neutral wire N: (1) a normally closed switch A-3-C in series with the test switch 16 and/or (2) the resistor R'.

A tabulated résumé of the operations in the system of Figure 9 is as follows:

*End of normal condition: Alert.*—Switch 11 closes a coil A circuit H, 11, A, N. The switches A-1, A-2-0 and A-3-0, previously open, are closed; A-2-C and A-3-C, previously closed, are opened. The normally open switches A-1 and B-1 both of which are now closed establish an A coil seal-in circuit parallel with the field switch 11; that is: H, B-1, A-1, A, N. Since A-2-0 closes and B-2 is in closed condition a horn circuit is made: H, 15, C, A-2-0, B-2, R, 12, N. The horn starts sounding. Parallel therewith a flasher motor circuit is made: H, 15, C, A-2-0, B-2, R, 17-M, N. Since A-3-0 closes and B-3-0 is in closed condition flashing circuits are now made through the flasher relay: H, 15, C, 24, A-3-0, B-3-0, F, 17-S, N. The light units 24 and 24-B start flashing. Light 24-A goes off due to the opening of A-4. The light 24-E stays on through the switch B-4.

*Acknowledgment: End of alert.*—Switch 15 momentarily de-energizes bus C, thereby breaking both circuits available for the coil B. Switches B-1, B-2, B-3-0 and B-4 open; B-3-C closes. B-2 stops the horn and flasher motor. B-3-0 and B-3-C change the lamp 24 from the flashing to the steady bright condition. Lamp 24-A stays off. Lamps 24-B and 24-E go off together with the coil B.

*End of alarm and return to normalcy.*—Switch 11 opens. Since the coil A is no longer sealed in through the switch B-1 this coil is now de-energized. The switch A-1 is opened. The switches A-2-0, A-3-C and A-3-0, A-3-C return to their normal position. A-1 and A-2-0 prepare for the next alarm. A-2-C closes a B relay circuit H, 15, C, A-2-C, B, N. Switch A-3-0 as well as B-3-0 prevents continued bright lighting of lamp 24 so that this lamp from now on is lighted only dim, through R'. Lamps 24-A, 24-E (bright) and 24-B (dim) go on. (Should the switch 11 open before the change from alert to acknowledged alarm, instead of the sequence as assumed above, it would have no effect due to the A coil seal-in circuit.)

Thus the system of Figure 9 obtains a very comprehensive and safe announcement of the different field conditions. The alarm horn 12 provides the general plant alert, and the different alarm light units 24, 24-A, 24-B and 24-E provide full distinction between the different phases of operation. The alarm lamps 24 which may be installed for instance behind red bulls'-eye glasses on a graphic panel, will show all field conditions, being normally dim, flashing on alert, and steady bright on acknowledged alarm. The test button 16 provides a positive test even when it is difficult to distinguish between dim and off conditions of the lamp 24 due to sunlight or the like. Lamps 24-B and 24-E can be installed in a straight-lined bank on the panel, and may both be white. When one of them (24-E) is on this shows normal field conditions. When both are on this shows an alert. When both are off this shows acknowledged alarm. The lamp 24-A can be added to provide independent announcement of normal running condition of the apparatus protected by field switch 11.

It is also possible as preferred in certain cases, to have all alarm lights 24, etc., adjacent one another, either on the panel or in the field or both. On the other hand it is possible to omit any one or more of the lamp units 24, 24-A, 24-B and 24-E. For instance in the field, the presence of one light 24-E can be used to show the normal condition of the apparatus, while the presence of two lights 24-B and 24-E can show the presence of an alert.

Other simplifications of the system or operation of Figure 9 will be discussed in the following. It will be seen that the present wiring chassis 10 and plug-in 17 by means of the relatively simple interchangeable circuit system therein allow practically any desired permutation of the numerous announcement programs available with up to five annunciators 12, 24, 24-A, 24-B and 24-E.

Figure 10:
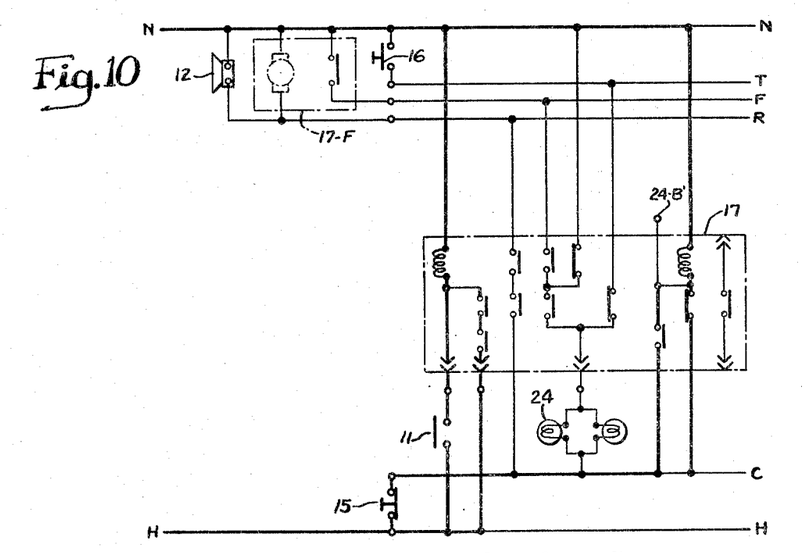
Figure 10 shows a first modification which can be applied to the schematic diagram of Figure 9 while using substantially unmodified instrument units according to this invention.

*Figure 10*

The modified system or operation according to Figure 10 uses the same panel and plug-in apparatus as does the preceding Figure 9 but uses a modified lamp and door unit 22' with flashing back-lighted name plates. This type of light unit is preferable mainly in two instances: (1) in central control rooms where there is a great multiplicity of alarms in a relatively small space and where the attendant must read some definite legend in order to interpret the appearance of an alarm light properly; and (2) in graphic panels, where a lettered name plate forms an integral part of a flow diagram symbol. Here the use of more than one bulls'-eye or other lamp unit, for the representation of one field unit, would be confusing; also the distinction between bright and dim conditions is not as easy as in the case where like units are arranged in close proximity to one another and in straight rows or geometrical patterns.

Back-lighted name plates usually show little difference between bright and dim conditions. Therefore the modified system merely shows the name plate dark, flashing or lighted steady.

Figure 15:
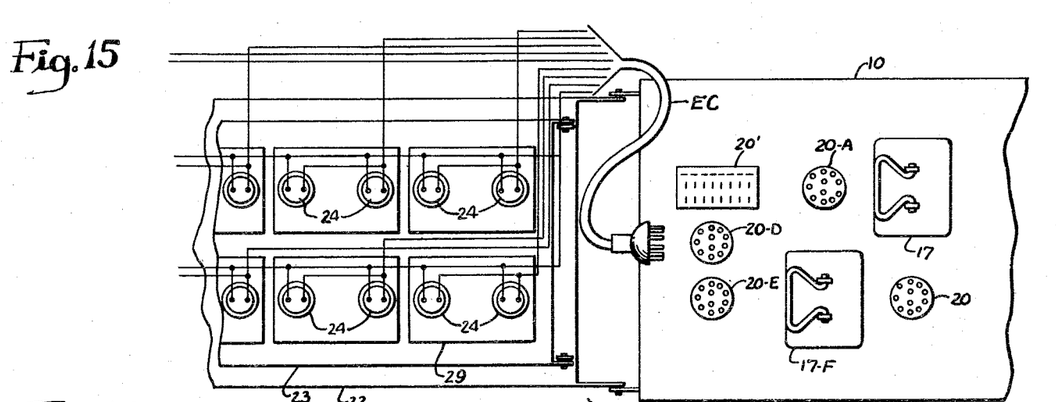
Figure 15 is a partial front view partly using diagrammatic circuit representation and showing part of the cabinet of Figure 3 or 14 together with an opened front door unit; the electrical system shown being part of that according to Figure 10.

In order to change a complete electric system of Figure 9 into the form of Figure 10 it is only necessary to leave the plug-in socket terminals 24-A' and 24-B' unconnected and to provide modified light units in the panel front or cabinet door 22. The basic instrument units 17 (Figures 5 and 6) and 10 (Figure 14) can be the same as before. The cabinet door and light units for Figure 10 are shown in Figure 15.

One of the eight relay switches in each plug-in (switch A-4) is not utilized in this modified system. Likewise some of the terminals and wires in the cabinet are not utilized. Theoretically this might appear wasteful. Practically however the unutilized expense is far outweighed by the savings obtained as a result of standardization.

This may be noted most clearly from an inspection of Figure 14. This figure indicates that practically, a strand or cable C-B of bus wires is required to connect the six bus lines N, T, F, R, C and H to the required number of points, including proper terminals for the eight sockets 20 (one of which is shown). In addition the instrument provides:

(1) A cable C-10 of signal wires from the eight field switches 11–A, 11–B, etc. (two of them being shown) to the terminals in the eight sockets 20 corresponding therewith (one of them being shown).

Figures 7, 8:
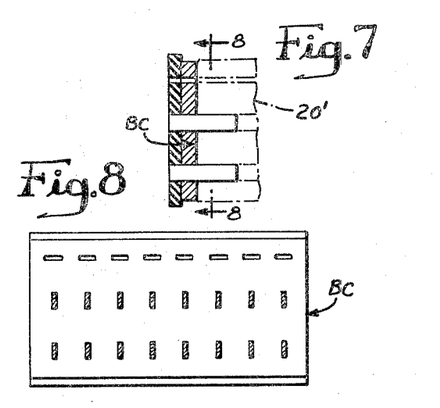
Figure 7 is a section through a special jumper unit which may be installed in said cabinet the section being taken along the lines 7—7 in Figure 3.
Figure 8 is another section through said jumper unit the section being taken along lines 8—8 in Figure 7.

(2) A cable C–8 of wires from a suitable terminal in each socket 20 (one of them being shown) to a corresponding terminal 20–B in the auxiliary socket 20'. Here a suitable jumper between terminals 20–B and 20–H provides the required lock-in connections for the A coils. Figures 7, 8 show a jumper of this general kind.

(3) A cable C–9 of wires from suitable terminals in each socket 20 (one of them shown) to a corresponding terminal in the auxiliary socket 20–D to provide, by an extension cord E–C the required connections for the light unit 24 on the door 22 (shown in detail in Figure 15). The cabinet also provides:

(4) A cable C–11 of wires from suitable terminals in each socket 20 (one of them shown) to a corresponding terminal in the auxiliary socket 20–E, for connections such as those shown in Figure 9 at 24–B. This cable remains unutilized or unconnected according to Figure 10, but in the interest of interchangeability, cabinet and socket space is reserved for this cable and the parts direcly connected therewith. It is also possible that one ore more field units and corresponding plug-in units require a connection C–11, while others do not. It is possible with the present instrument so to vary the different units of the same panel.

The sequence of alarm operations provided by Figure 10 will probably be understood without detailed tracing of circuits, on the basis of the foregoing explanations. During the alert, the horn sounds and the proper back-lighted name plate flashes. Upon acknowledgment the horn is silenced and the proper name plate is lighted steady. Upon return to normalcy the name plate is darkened.

Figure 11:
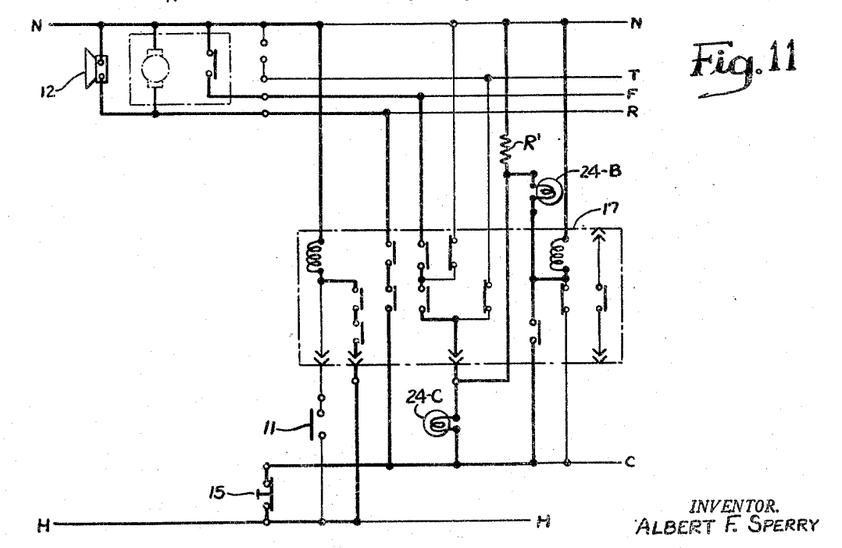
Figure 11 is a second similar modification of the schematic diagram of Figure 9.

*Figure 11*

Bull's-eye alarms have several distinct advantages, including compactness and excellent visibility over a wide range of distances and viewing angles. One system of this kind is shown in Figure 11.

Figure 16:
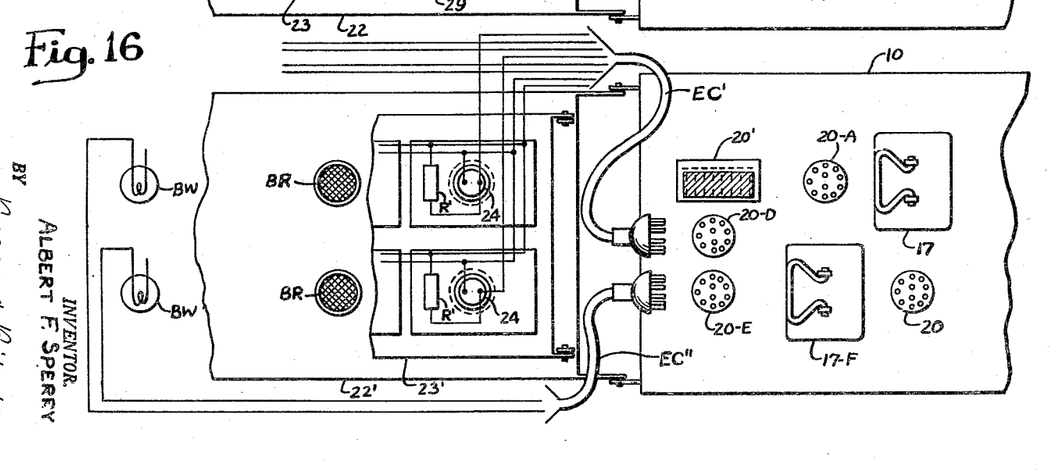
Figure 16 is a view generally similar to Figure 15 but modified for Figure 11.

The cabinet wiring, again, will best be exactly the same as in Figure 14. On the other hand the door and light units again are modified. Their physical appearance is illustrated by Figure 16. The units 24–B and R', known from Figure 9, are used, without the units 24–A. A modified extension cord E–C' is provided for this purpose.

It is possible although not necessary to locate the red bull's-eye B–R on the panel door 22' and the white bull's-eyes B–W elsewhere in the field or control room. These units B–W form one variety of the so-called running light. They can be installed for instance on the motors, pumps, etc., which they represent. A special extension cord E–C'' may be used for this purpose.

The modified sequence or program is as follows: Alert—the horn sounds, 24–C is flashing bright red; 24–B is dim white. Acknowledged alarm—24–C is steady bright red; 24–B is off. Normal—24–C is dim red; 24–B dim white. No test button 16 is required except in the event that dark and dim conditions are hard to distinguish.

Figure 12:
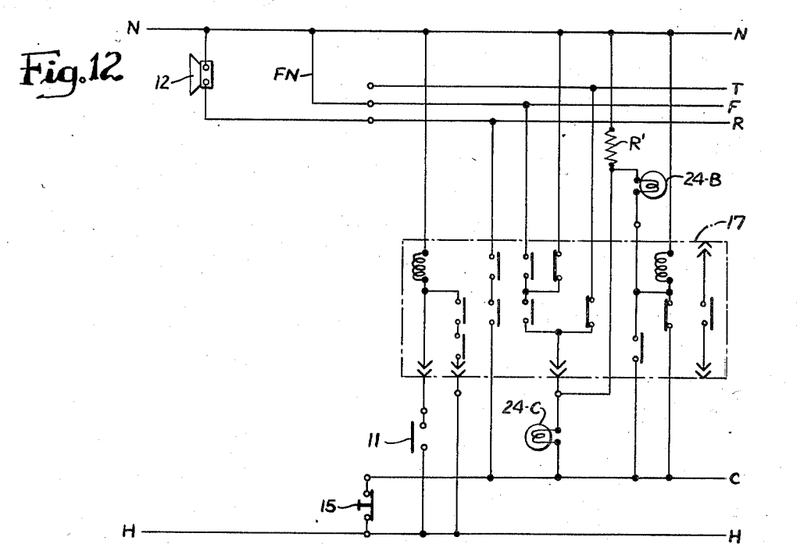
Figure 12 is a third similar modification of the schematic diagram of Figure 9.

*Figure 12*

Another popular bull's-eye system is shown in Figure 12. This uses lights which are on during the alert. A system of this kind may use dim red and white lights during normal condition; bright steady red and dim white for alert; bright steady red and no white for acknowledged alarm.

This system omits the flasher relays 17–F and substitutes for the same a permanent connection F–N from bus F to neutral bus N, physically provided by a conventional jumper between the two corresponding terminals on the terminal strip 28. While accordingly the sockets 20–A are not utilized for flashing purposes it may be noted that they can be utilized instead, in view of additional sockets 20, to provide the cabinets 20 with ten rather than eight light units and corresponding relay plug-in units. It may only be necessary for this purpose to install one or two additional connections C–8, C–9 and C–11. All other terminals of sockets 20–A are already wired in parallel with those of the sockets 20 (it may be noted at this point that by virtue of this parallel wiring the flasher plug-ins 17–F can be inserted anywhere on sockets 20–A or 20 without special wiring modification, thereby providing further safety against accidental breakdown or confusion due to interchange of plug-in units).

Figure 17:
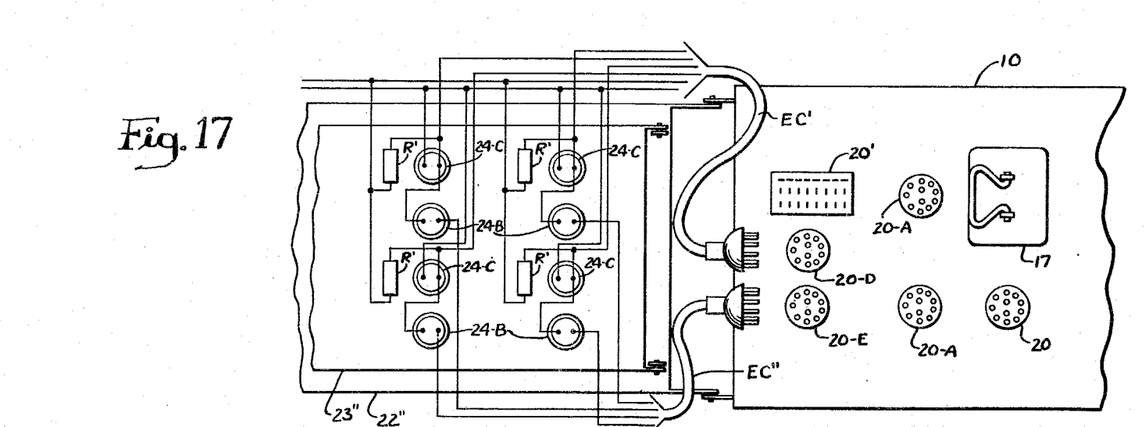
Figure 17 is a view generally similar to Figure 15 but modified for Figure 12.

The light and door unit for the present system is shown in Figure 17. It uses, by means of extension cords E–C' and E–C'', a basically similar light system 24–C, 24–B and R' as does the form of Figures 11 and 16. However the white light system 24–E is here shown as being installed on the control panel.

Figure 13:
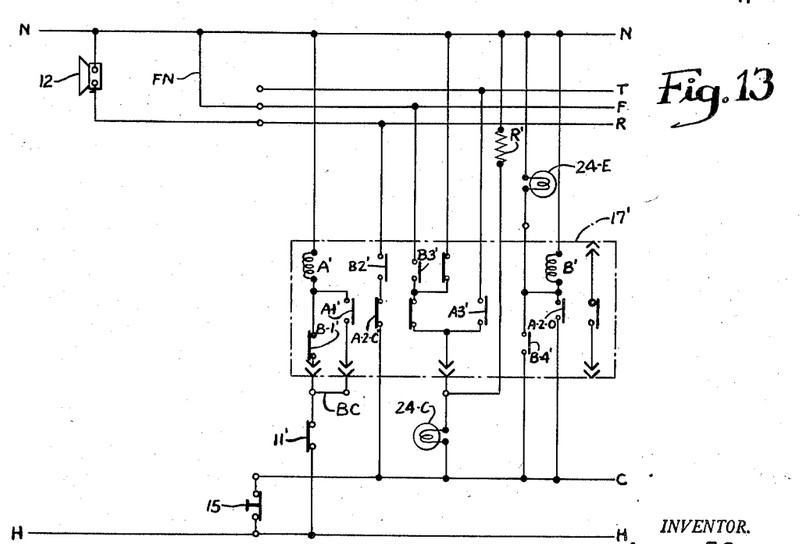
Figure 13 is a fourth similar modification of the schematic diagram of Figure 9.

*Figure 13*

Still another bull's-eye system uses a bright running light, usually green, which is off during acknowledged alarm and which is often mounted on the motor, pump or other process units, while another light, either white or red, is installed in the control room to distinguish between alert and acknowledged alarm as well as normal condition, by different lighting.

Figure 18:
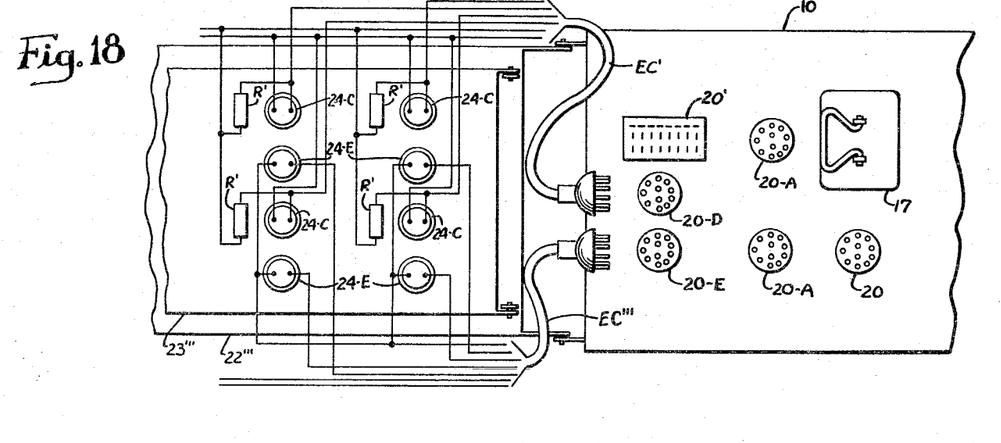
Figure 18 is a view generally similar to Figure 15 but modified for Figure 13.

For such purposes Figures 13 and 18 modify the auxiliary (green) light system 24–E, connecting it directly to the neutral wire N by an extension cord E–C.

A further modification, which can be made in all of the systems shown, is illustrated in Figure 13: The field switch 11' is normally closed. It opens once or repeatedly upon abnormal field operation.

Again no change is required in the cabinet unit of Figure 14. Only a slightly changed relay plug-in 17' and a special jumper in socket 20–H are required. It is possible to operate with normally opened field switches in some systems connected to a single instrument cabinet and with normally closed field switches in others, connected to the same instrument cabinet. The different plug-in units in the cabinet must then be distinguished from one another by color symbols or the like in order to insure reinsertion in the proper sockets, after removal for testing purposes.

The change in the plug-in is minor. The same number of relay coils and relay switches is used as has been described and explained above. It is only necessary to modify the internal wiring slightly. The switches B–1' and A–2' are normally closed and in the switch A–3' the normally closed and normally open terminal connections are reversed, as compared with the relay unit 17 described above. B–1' is in parallel, not in series with A–1'.

Normally the coil A' of the modified plug-in unit is kept energized through A–1' (connected by a jumper B–C in socket 20'). The coil B together with light 24–E is kept energized in the normal condition through A–2–0' and B–4'. Light 24–C' is disconnected at A–3–C' and connected only through R'.

Opening of the field switch 11' de-energizes coil A'. This establishes horn sounding circuit through A–2–C' and B–2', together with bright lamp circuit through B–3' and A–3–C'.

Opening of the acknowledgment switch 15 de-energizes the coil B at B–4', the switch A–2–0' having been opened before. This breaks the horn circuit at B–2' while practically not affecting the bright lamp circuit through the double throw switch B–3'.

Closing of 11', with B–1' already closed, re-energizes coil A', breaking the steady bright lamp circuit at A–3–C' and leaving only the reduced lamp current through the dimmer resistor R'. Closing of A–2–0' energizes B'.

*Features shared by Figures 9 to 18*

It will be noted that the principal alert annunciators (12 alone or 12 and 24–A) and the principal modifiable annunciators (24 or modifications thereof) are operated by two separate circuit systems. The first of these comprises the annunciators 12 and/or 24–A and also the relay coil B. The second comprises the annunciator 24. These two circuit systems are provided in addition to one comprising the relay coil A, and in addition to a fourth or auxiliary circuit system, comprising the switch A–4 and potentially serving still other annunciators. The system comprising coil A might be called "1"; that with coil B and annunciators 12 and 24–A might be called "2"; and that with annunciator 24 might be called "3."

This system "3" is particularly important for the present invention. In its most complete form as shown in Figure 9, it comprises two double-throw switches, in several distinct and separate circuit branches, for four different types of operation of the lamp 24: (a) a branch comprising the switch element B–3–C for steady lighting of the branch during achnowledged alarm; (b) a branch comprising the switch element B–3–0 for the flashing of the lamp during the alert (the branches a and b being parallel and having the switch element A–3–0 interposed between the same and the lamp); (c) a branch comprising the switch element A–3–C for steady lighting of the lamp upon a test conducted during the normal condition of the system; and (d) a branch comprising the dimming resistor R'. The equipment of the branches a, b and c is located within the plug-in unit; that of branch d, externally.

The circuit system "2" basically provides two circuit branches in parallel, one comprising the coil B and the other comprising the annunciator 12. The first of these branches is ultimately connectable to the C wire through the switch element A–2–C or the switch B–4 while the second branch, parallel with the first, contains the switch elements A–2–0 and B–2 in series. The annunciator 24–E is a more or less auxiliary element, connectable in parallel with the coil B.

It is by means of this circuitry that the present instrument is capable of serving a greater variety of switching and announcing systems, thereby providing greater safety and economy than has been available in the past. Only two double throw switches A–3 and B–3 are required for the main alarm light 24 in five or more different systems. Only three further switches A–2, B–2, B–4 are required for the added annunciators 12, 24–E, in these five or more systems. Thus a total of only five operating switches A–2, B–2, A–3, B–3 and B–4 is required. Thus a relatively simple, uniform wiring in plug-ins 17 as well as panels or cabinets 10 allows a relative maximum of interchangeable forms of alarm.

No modification is required in the construction of the major equipment units 17 and 10 to produce these changeable forms. Only a slight electrical change, without mechanical change, is required in the plug-ins to compensate for different types of field switches, as illustrated by Figure 13 in contrast with Figures 9, 10, 11 or 12. Practically all variations required in practice are effected by the mere provision of modified front panels and light combinations thereon, integral with proper plug-in elements such as extension cords.

Still further modifications of course can be applied by persons skilled in the art upon a study of this disclosure.

I claim:

1. Annuciator system apparatus comprising a series of condition responsive signal switches, a corresponding number of annunciator units, chassis support means, a series of multiple relay unit connector means secured to said support means, there being at least one such multiple connector means associated with each signal switch, separately removable relay units having connector terminals adapted to make contact with the associated multiple connector means and including circuit connections which connect said signal switches and signal annunciator units to form an operative annunciating system, an additional multiple connector means on said chassis, and a separately removable annunciator modifying unit adapted to contact said additional connector means and including circuit means which modify the signals of said annunciator units.

2. Apparatus as described in claim 1 wherein said additional connector means and said first-mentioned series of connector means have several of their terminals wired identically whereby said annunciator modifying unit may be operative when inserted in contact with any of said multiple relay unit connector means.

3. Apparatus as described in claim 1 wherein said additional connector means and said series of relay unit connector means are identically wired, whereby either said annunciating modifying unit or said relay unit may be usable in any of said connectors.

4. Apparatus as described in claim 1 wherein said annunciator units include an array of alarm lamp units equal in number to said signal switches and a common extension cable having individual connectors connecting at one end with said respective alarm lamp units and at the other end with a common connector, and a complementary connector which receives said extension cable connector and connects with said respective relay units.

5. Apparatus as described in claim 1 wherein said annunciator units each comprise a back-lighted main plate and an alarm lamp unit mounted therebehind, and said annunciator modifying unit is adapted to cause flashing of the alarm light units which are lighted in response to an abnormal condition of the associated signal switches.

6. Annunciator system apparatus comprising a series of condition responsive signal switches, a corresponding number of annunciator units, chassis support means, a series of multiple relay unit connector means secured to said support means, there being at least one such multiple connector means associated with each signal switch, separately removable relay units having connector terminals adapted to make contact with the associated multiple connector means and including circuit connections which connect said signal switches and signal annunciator units to form an operative annunciator system, an additional multiple connector means on said chassis, and a separately removable annunciator modifying unit modifying the announcement of all of said annunciator units, said annunciator modifying unit adapted to contact with said additional connector means and including circuit means which modify the signals of said annunciator units without requiring any other substantial change in the annunciator apparatus.

7. Annunciator apparatus for use on a number of different types of annunciator systems, comprising a group of plug-in connector terminals, a plug-in relay unit removably interengaged with said group of connector terminals and making electrical connection therewith, a signal annunciator unit, said plug-in relay unit having relay means and associated contacts for controlling the operation of said signal annunciator unit, a group of main connector terminals to be connected to signal switches, means interconnecting said group of plug-in connector terminals with said signal annunciator unit and said main connecting terminals externally of said relay unit, an additional group of plug-in connector terminals and circuit means interconnecting said additional plug-in connector terminals with said main connecting terminals externally of said relay unit, and annunciator modifying plug-in means adapted to interengage with said additional plug-in connector means to modify the signal announcement of said signal annunciator unit without any other substantial modification of the annunciator apparatus.

8. Annunciator apparatus comprising a cabinet, a first door for said cabinet having mounted thereon a number of lamp units and attached connector means leading to said lamp units, a second door having a number of lamp units mounted thereon which are adapted to provide a different alert indication from said first-mentioned lamp units, attached connector means secured to said second-mentioned lamp units which connector means are wired differently from said other connector means, said cabinet having a connector panel with connector means adapted to receive, removably and selectively, said two above-mentioned annunciator lamp connector means, relay unit connector means on said panel for removably receiving relay units each adapted for operation with both of said annunciator lamp units, and circuit means leading to said annunciator unit connector means and relay unit connector means on said panel for operating said two respective types of door mounted lamp units.

9. The annunciator apparatus of claim 8 wherein said first-mentioned lamp units are back-lighted units and said second-mentioned lamp units are bulls-eye type units.

10. Annunciator apparatus comprising a cabinet having a door and a number of removable annunciator lamp units carried by the door and adapted to provide one type of visual alert announcement means, removable connector means for said lamp units, said cabinet having a connector panel having a number of similar groups of relay unit connector terminals which are adapted removably to receive respective relay units for controlling the operation of said respective annunciator lamp units, said panel also having a group of connector terminals adapted removably to receive said connector means of said annunciator lamp units, said panel supporting a second group of connector terminals adapted removably to receive connector means of a differently wired annunciator assembly producing a different visual alert announcement than said other lamp units, and circuit connecting means interconnecting the connector terminals of said panel externally of said relay units.

11. Annunciator apparatus comprising a number of annunciator lamp units adapted to provide one type of visual announcement, a plug-in connector means for said lamp units, a chassis supporting a number of similar groups of relay plug-in connector terminals which are identically wired and adapted to receive respective relay plug-in units for controlling the operation of said respective annunciator lamp units, said chassis also having plug-in connector terminals adapted to receive removably said plug-in connector means of said annunciator lamp units, and said chassis supporting another group of plug-in connector terminals adapted to receive plug-in connector means of a differently wired lamp unit assembly producing a different visual announcement than said other lamp units without requiring any change in said annunciator apparatus, and circuit connecting means interconnecting the connector terminals of said chassis externally of said relay plug-in unit.

12. Annunciator apparatus comprising universal chassis support means carrying electrical connector means adapted to receive removably and selectively electrical connector means of a number of different types of visual alert annunciator means requiring different connections with the chassis circuits, and chassis circuit means leading to said connector means and arranged to permit selective operation of said different annunciator systems, said chassis circuit means also including connector means for removably receiving connector means of a relay unit for controlling said annunciator means, the chassis and relay unit circuitry being such that the same relay unit is usable with any of said different annunciating systems.

13. Annunciator apparatus comprising universal chassis support means carrying electrical connector means adapted to receive removably and selectively electrical connector means of a number of different types of visual alert annunciator means requiring different connections with the chassis circuits, and chassis circuit means leading to said connector means and arranged to permit selective operation of said different annunciator systems, said chassis circuit means also including respective relay apparatus for controlling said respective annunciator means, the chassis and relay circuitry being such that the same relay apparatus is usable with any of said different annunciating means.

14. Annunciator apparatus comprising first annunciator light means including an integral removable assembly of alert lamp units and attached connector means having individual connecting wires leading to said lamp units, second annunciator light means including an integral removable assembly of alert lamp units wired to present a different annunciator light sequence from said first assembly, and attached connector means having individual connecting wires leading to said lamp units, third annunciator light means including an integral assembly of alert lamp units wired to present a different annunciator light sequence from said above assemblies and attached connector means including individual connecting wires leading to each of said lamp units, a flasher light unit for use with some but not all of said annunciator light means and including attached electrical connector means, and universal chassis support means usable with all of said annunciator means and including electrical connector means for selectively removably receiving said connector means of said first, second and third annunciator light means, connector means for removably receiving said flasher light unit connector means, and circuit means connecting with all of said connector means of said chassis support means.

15. Annunciator apparatus comprising first annunciator light means including a removable assembly of alert lamp units and attached connector means having individual connecting wires leading to said lamp units, second annunciator light means including a removable assembly of alert lamp units wired to present a different annunciator light sequence from said first assembly, and attached connector means having individual connecting wires leading to said lamp units, third annunciator light means including an assembly of alert lamp units wired to present a different annunciator light sequence from said above assemblies and attached connector means including individual connecting wires leading to each of said lamp units, and universal chassis support means usable with all of said annunciator means and including electrical connector means for selectively removably receiving said connector means of said first, second and third annunciator light means, and circuit means connecting with all of said connector means of said chassis support means.

16. Annunciator apparatus comprising first annunciator light means including a removable assembly of a series of windows behind which a signal lamp unit is mounted and connector means having individual connecting wires leading to said lamp units, second annunciator light means including an integral removable assembly of a series of single bulls-eye type light units and attached dimming resistors connected to dim said lights during normal operation, said last-mentioned integral assembly also including connector means having individual connecting wires leading to said bulls-eye lights and resistors respectively, third annunciator light means including an integral assembly of respective pairs of bulls-eye light units and connector means including individual connecting wires leading to each of said bulls-eye light units, a flasher light unit for use with said first and second annunciator means and including electrical connector means, and universal chassis support means usable with all of said annunciator means and including electrical connector means for selectively removably receiving said connector means of said first, second and third annunciator light means, and connector means for removably receiving said flasher light unit connector means, and circuit means connecting with all of said connector means of said chassis support means to (1)

operate said first annunciator means to provide the sequence of no light during normal operation, flashing light during abnormal operation and steady light during acknowledgment; (2) operate said second annunciator means to provide a dim light during normal operation, flashing light during alert operation and steady light during acknowledgment; and (3) operate said third annunciator means by effecting the dimming of one light of each pair during normal operation, and lighting the latter light brightly during alert and acknowledgment, and operate the other light of each pair by effecting the lighting thereof during normal operation and alert and extinguishing said latter light during acknowledgment.

17. Annunciator system apparatus for establishing connection with a number of individual condition responsive signal switches, comprising a number of individually removable relay units, some of said relay units being designed for use with normally open signal contacts and other relay units being designed for use with normally closed signal switch contacts, respective groups of relay connector terminals which respectively removably receive said relay units, respective main connecting terminals providing connecting points to said respective signal switches, said groups of relay unit connector terminals being identically wired to said main connecting terminals and adapted to receive and cooperate with relay units designed for use with either normally open or normally closed signal switch contacts, and said relay units being variously designed to cooperate with said identically wired terminals.

18. Annunciator system apparatus for establishing connection between a number of condition responsive signal switches, alarm means and switch control means, comprising a number of individually removable relay units each containing all relay apparatus exclusive to a given test point to be monitored, some of said relay units being designed for use with normally open signal contacts and other relay units being designed for use with normally closed signal switch contacts, a common chassis panel having respective groups of relay connector treminals which respectively removably receive said relay units, respective main connecting terminals providing connecting points to said respective signal switches, said alarm means and switch control means, said groups of connector terminals being identically wired to said main connecting terminals and adapted to receive and cooperate with relay units designed for use with either normally open or normally closed signal switch contacts, said relay units being variously designed to cooperate with said identically wired groups of terminals, and a group of adjacent sets of bridgement terminals and connections between corresponding terminals of said groups of relay connector terminals externally of said relay units and a terminal of a different set of said bridgement terminals, and connections between the main connecting terminals to be connected with the signal switches and the associated terminal of said respective sets of bridgement terminals, whereby the terminals of each set of brigement terminals may be selectively interconnected or disconnected for operation with either normally open or normally closed signal switch contacts.

19. Annunciator system apparatus for establishing connection with a number of condition responsive signal switches, comprising a number of individually removable relay units, some of said relay units being designed for use with normally open signal contacts and other relay units being designed for use with normally closed signal switch contacts, respective groups of relay connector terminals which respectively removably receive said relay units, respective main connecting terminals providing connecting points to said respective signal switches, said groups of connector terminals being identically wired to said main connecting terminals and adapted to receive and cooperate with relay units designed for use with either normally open or normally closed signal switch contacts, said relay units being variously designed to cooperate with said identically wired groups of plug-in terminals, and a group of adjacent sets of bridgement terminals and connections between corresponding terminals of said groups of relay connector terminals externally of said relay units and a terminal of a different set of said bridgement terminals, and connections between the main connecting terminals to be connected with the signal switches and the associated terminal of said respective sets of bridgement terminals, whereby the terminals of each set of bridgement terminals may be selectively interconnected or disconnected for operation with either normally open or normally closed signal switch contacts.

20. Annunciator system apparatus for establishing connection with a number of individual condition responsive signal switches, comprising a number of individually removable relay units, some of said relay units being designed for use with normally open signal contacts and other relay units being designed for use with normally closed signal switch contacts, respective groups of relay connector terminals which respectively removably receive said relay units, respective main connecting terminals providing connecting points to said respective signal switches, said groups of relay unit connector terminals being identically wired to said main connecting terminals and adapted to receive and cooperate with relay units designed for use with either normally open or normally closed signal switch contacts, and respective visual annunciator units associated with said respective signal contacts and connected with said respective groups of relay connector terminals externally of the associated relay units, and said relay units adapted for use respectively with normally closed and normally open signal contacts being variously designed to cooperate with said identically wired terminals for controlling said respective annunciator units.

21. An alarm instrument for control by a series of field or signal alarm switches and an alarm acknowledgment switch, said field switches and acknowledgment switch forming a switch system and the instrument comprising (A) a series of relay units individually connected with said alarm field switches, and (B) a series of alarm annunciator connector units, each connector unit comprising primary and alternate connector means for selectively connecting the respective lamp units with differently wired primary and alternate annunciator units, respectively, and said connector units adapted to receive removably individual complementary connector units of said annunciator units.

22. An alarm panel for control by a switch system comprising a series of field alarm switches, an alarm acknowledgment switch and a series of relay units individually connected with said field alarm switches, said panel comprising a first series of connector units for connecting each relay unit with the panel, and a second series of connector units for connecting the panel selectively with a series of differently wired annunciator units.

References Cited in the file of this patent

UNITED STATES PATENTS

| | | |
|---|---|---|
| 1,340,145 | Blair et al. | May 18, 1920 |
| 1,346,493 | Hammond et al. | July 13, 1920 |
| 1,658,516 | Daine | Feb. 7, 1928 |
| 2,107,525 | Derby | Feb. 8, 1938 |
| 2,116,947 | Ketay | May 10, 1938 |
| 2,493,548 | Proctor | Jan. 3, 1950 |
| 2,600,132 | Seaton | June 10, 1952 |